United States Patent
Yon et al.

(10) Patent No.: US 10,018,214 B2
(45) Date of Patent: Jul. 10, 2018

(54) FASTENER, IN PARTICULAR FOR FASTENING VEHICLE TRIM PANELS TO A SUPPORT

(71) Applicant: ILLINOIS TOOL WORKS INC., Glenview, IL (US)

(72) Inventors: Fulvio Pacifico Yon, Donnas (IT); Massimo Savi, Biella (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/505,279

(22) PCT Filed: May 28, 2015

(86) PCT No.: PCT/US2015/032997
§ 371 (c)(1),
(2) Date: Feb. 21, 2017

(87) PCT Pub. No.: WO2016/039827
PCT Pub. Date: Mar. 17, 2016

(65) Prior Publication Data
US 2017/0241462 A1    Aug. 24, 2017

(30) Foreign Application Priority Data

Sep. 12, 2014    (IT) .............................. TO2014A0716

(51) Int. Cl.
  *F16B 21/08*    (2006.01)
  *B60R 13/02*    (2006.01)
  *F16B 5/06*    (2006.01)
(52) U.S. Cl.
  CPC ............ *F16B 21/086* (2013.01); *B60R 13/02* (2013.01); *F16B 5/065* (2013.01)

(58) Field of Classification Search
  CPC ...... F16B 5/065; F16B 21/086; Y10T 24/303; Y10T 24/309; Y10T 24/44026; B60R 13/02
  See application file for complete search history.

(56) References Cited

U.S. PATENT DOCUMENTS 5,028,187 A * 7/1991 Sato .................... F16B 19/1081
                                                        411/41
5,689,863 A * 11/1997 Sinozaki ............. F16B 19/1081
                                                        24/297

(Continued)

FOREIGN PATENT DOCUMENTS

| JP | 2002 106519 | 4/2002 |
| JP | 2007 312530 | 11/2007 |
| WO | WO 2014099444 A1 | 6/2014 |

OTHER PUBLICATIONS

PCT, International Search Report and Written Opinion, International Application No. PCT/US2015/032997; dated Aug. 7, 2015, 10 pages.

*Primary Examiner* — Robert Sandy
(74) *Attorney, Agent, or Firm* — Thompson Hine LLP

(57) ABSTRACT

A fastener includes a head and snap-engaging portion that includes: —a shank projecting from the head and having a proximal end connected to the head and a distal end spaced from the head, and—two elastic arms in the form of a V, with respective first ends connected to the distal end and respective second ends arranged in the proximity of the head and spaced in the transverse direction on opposite sides of the shank, so as to form an arrow head shape, wherein the snap-engaging portion includes a substantially U-shaped retaining structure having two open ends connected integrally to the respective second ends of the elastic arms and a rounded portion which surrounds without contact the distal end of the shank, wherein the retaining structure has two (Continued)

snap-engaging seats which are open outwards, each being situated between the rounded portion and a respective open end.

6 Claims, 4 Drawing Sheets

(56) References Cited

U.S. PATENT DOCUMENTS

| | | | |
|---|---|---|---|
| 2004/0181917 A1* | 9/2004 | Sawatani | F16B 19/1081 |
| | | | 24/297 |
| 2006/0231690 A1* | 10/2006 | Cooley | F16B 21/086 |
| | | | 248/71 |
| 2007/0234527 A1* | 10/2007 | Aoyama | E05F 5/022 |
| | | | 24/297 |
| 2014/0047679 A1 | 2/2014 | Lepper | |

* cited by examiner

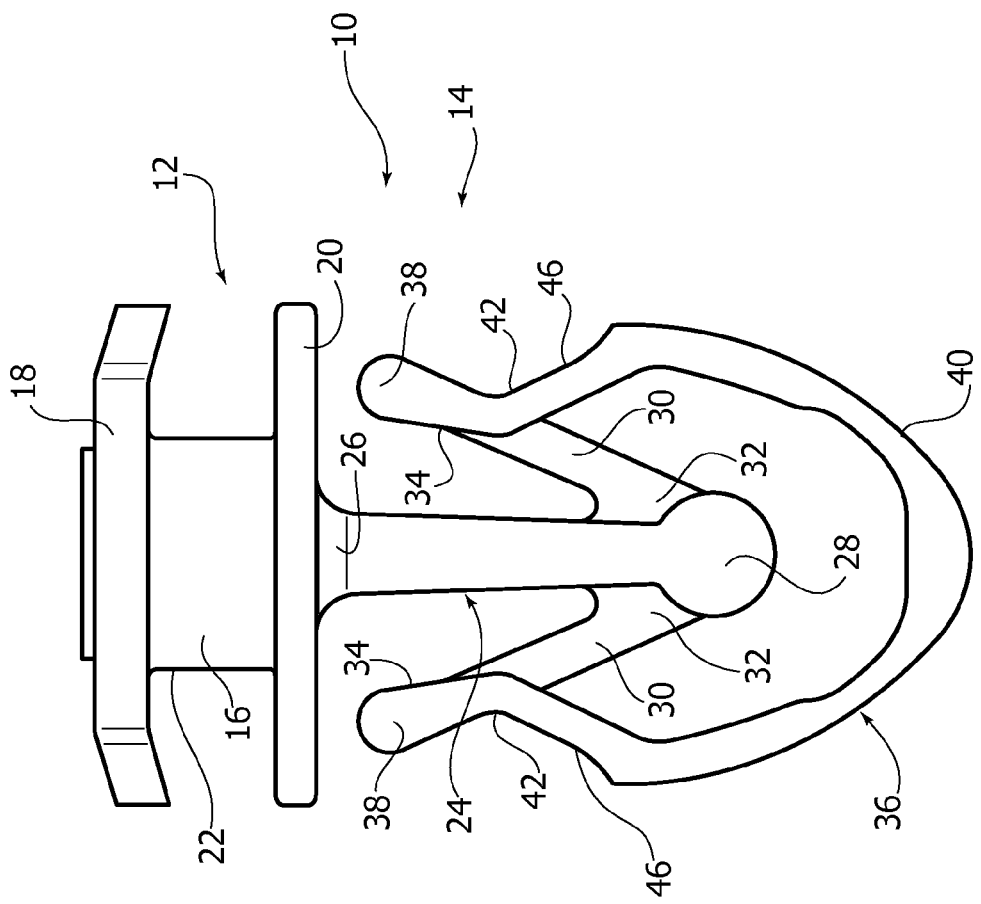

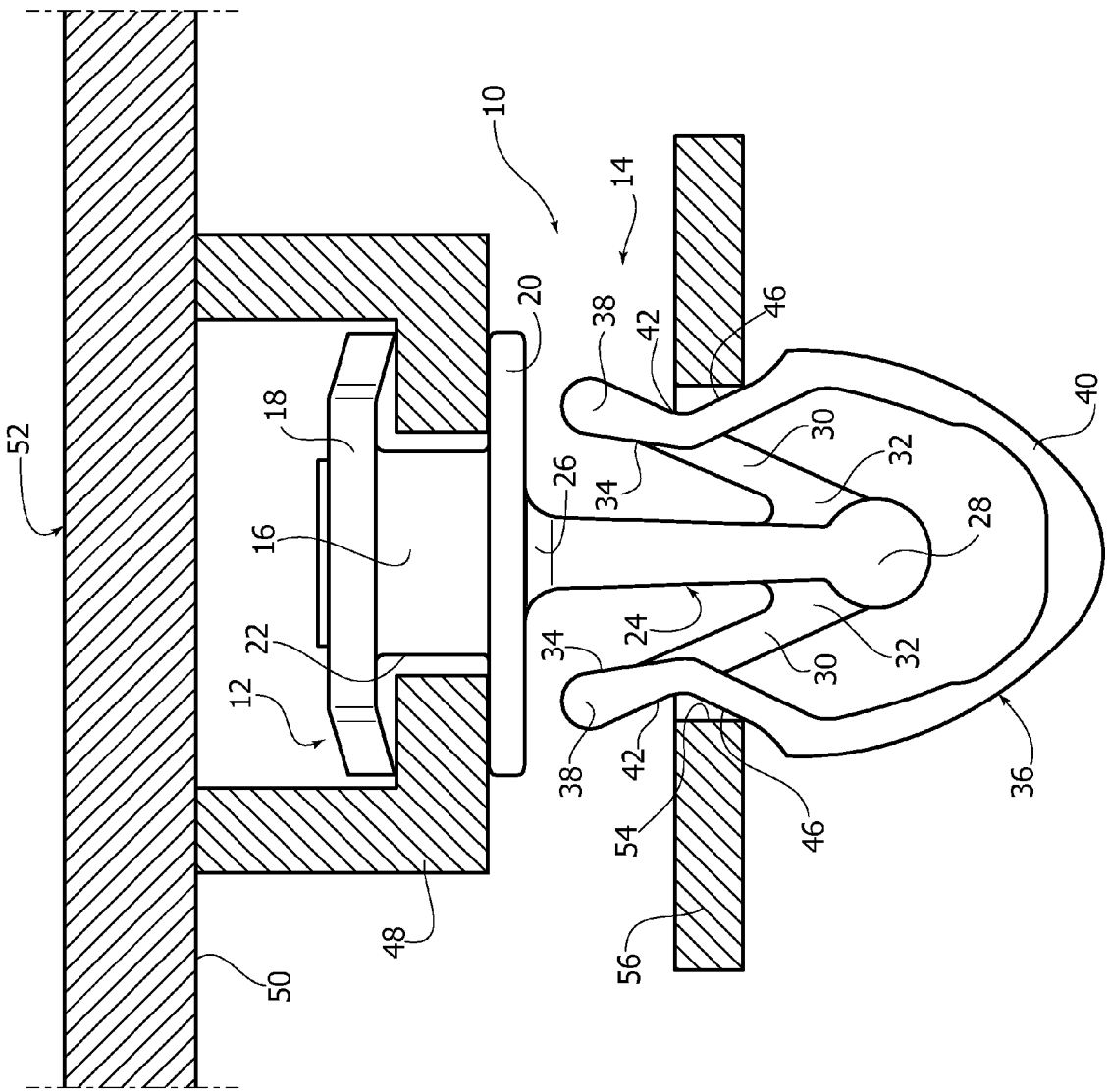

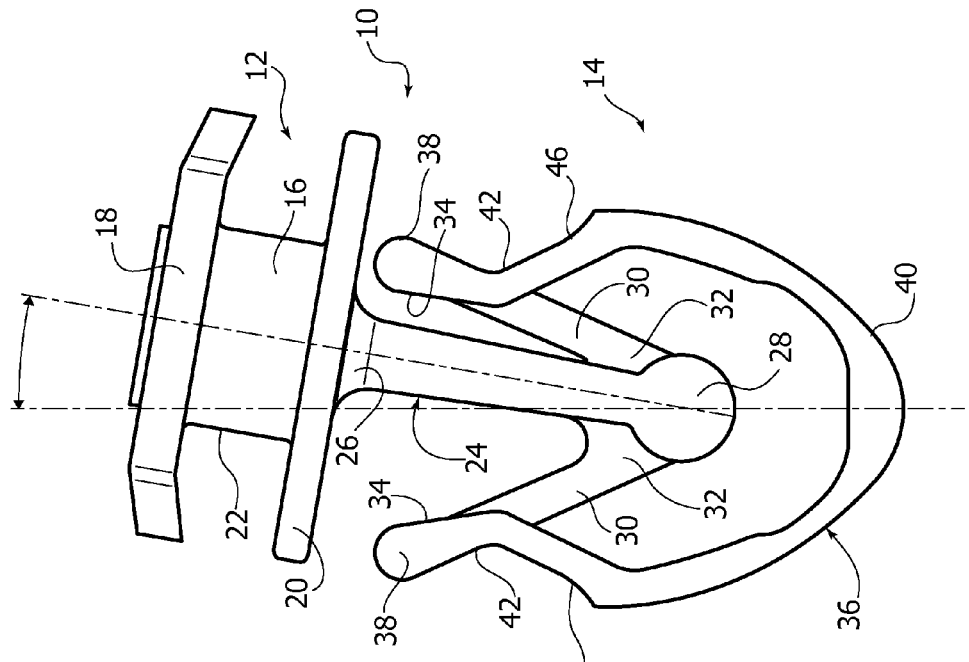
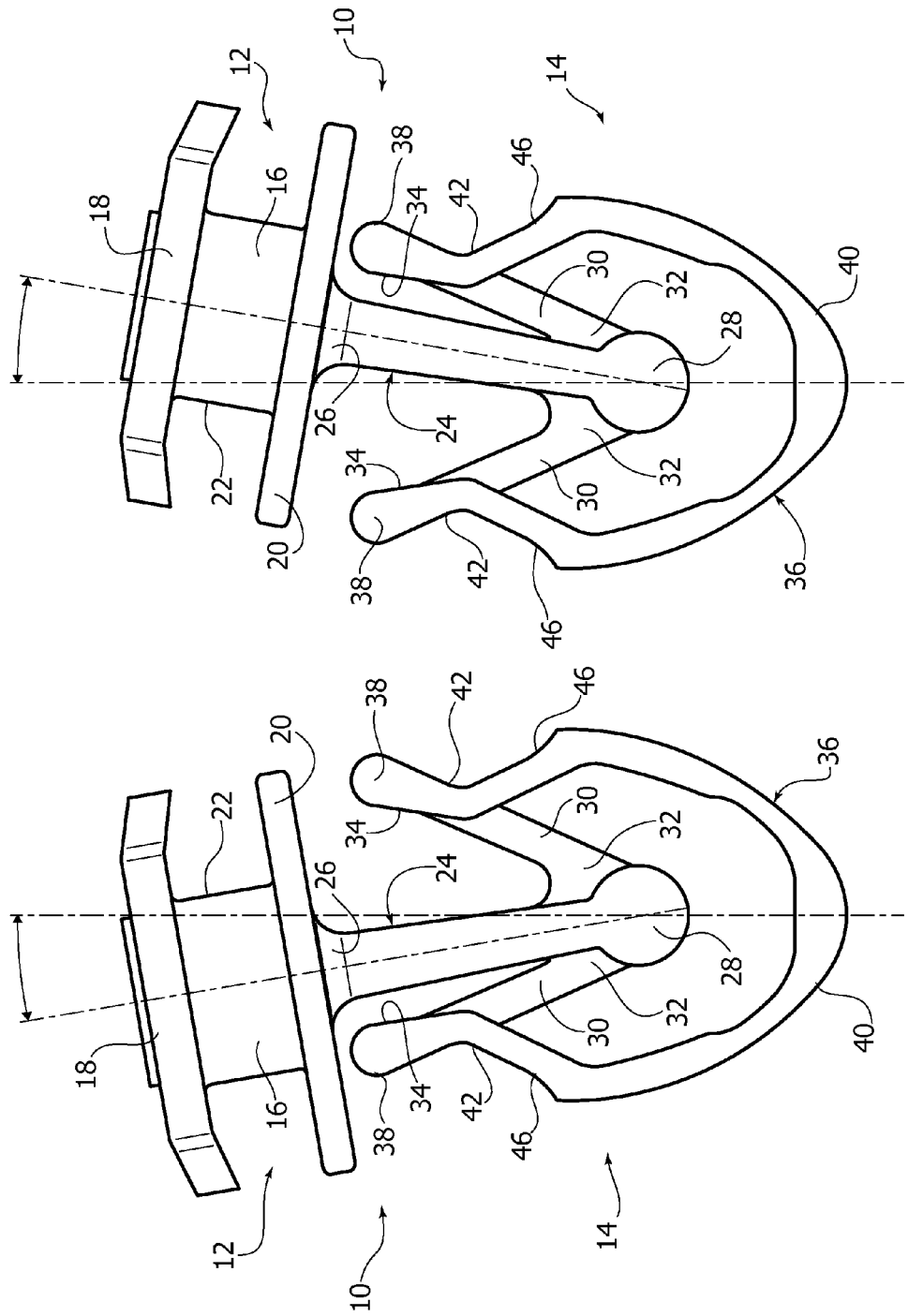

FASTENER, IN PARTICULAR FOR FASTENING VEHICLE TRIM PANELS TO A SUPPORT

FIELD OF THE INVENTION

The present invention relates to a fastener intended in particular to be used in the automobile sector for fastening internal trim panels to respective supports consisting for example of metal bodywork structures.

DESCRIPTION OF THE PRIOR ART

It is known that according to the present state of the art there exist many fasteners having a head intended to engage inside an inset seat provided on the rear wall of the trim panel and a snap-engaging portion designed to be snap-engaged inside a hole in the support to which the panel must be fastened.

The documents US 2014/0047679 and WO 2014/099444 describe fasteners comprising a head and a snap-engaging portion made of a single piece of injected-molded plastic, wherein the snap-engaging portion comprises:

a shank projecting from the head and having a proximal end connected integrally to the head and a distal end spaced from the head, and two elastic V-shaped arms having respective first ends connected integrally to the distal end of the shank and respective second ends arranged in the proximity of the head and spaced in the transverse direction on opposite sides of the shank, so as to form with the shank a structure substantially in the form of an arrow head.

During use, the shank of the snap-engaging portion is inserted inside an opening in the support and the elastically deformable arms are radially compressed inwards. The elastically deformable arms snap back outwards once insertion of the shank has been completed, so as to grip the walls of the hole in the support. The head of the fastener is fixed inside a seat provided on the rear wall of the trim panel before snap-engagement of the shank into the hole of the support. Therefore, the fastener forms a concealed connection between the trim panel and the underlying support.

In fasteners of this type there exists the need to allow the repeated insertion and extraction of the fastener from the support without the use of tools and without the risk of breaking the fastener. There also exists the need to provide fasteners which can be adapted to holes in the supports of varying width or varying thickness while ensuring a good connection. There also exists the need to provide fasteners which provide the possibility of movement of the head while keeping the fastener fixed inside the hole of the support.

OBJECT AND SUMMARY OF THE INVENTION

The object of the present invention is to provide a fastener made from a single piece of injection-molded plastic, which fastener is able to satisfy the aforementioned requirements.

According to the present invention, this object is achieved by a fastener having the characteristic features forming the subject of claim 1.

The claims form an integral part of the teaching provided in connection with the invention.

BRIEF DESCRIPTION OF THE DRAWINGS

The present invention will now be described in detail with reference to the accompanying drawings provided purely by way of a non-limiting example in which:

FIG. 2 is a front view of the fastener according to FIG. 1,

FIG. 3 is a cross-sectional view showing the fastener according to the invention during use, and FIGS. 4 and 5 show the possibility of pivoting the head of the fastener according to the invention.

DETAILED DESCRIPTION

Figure 1:
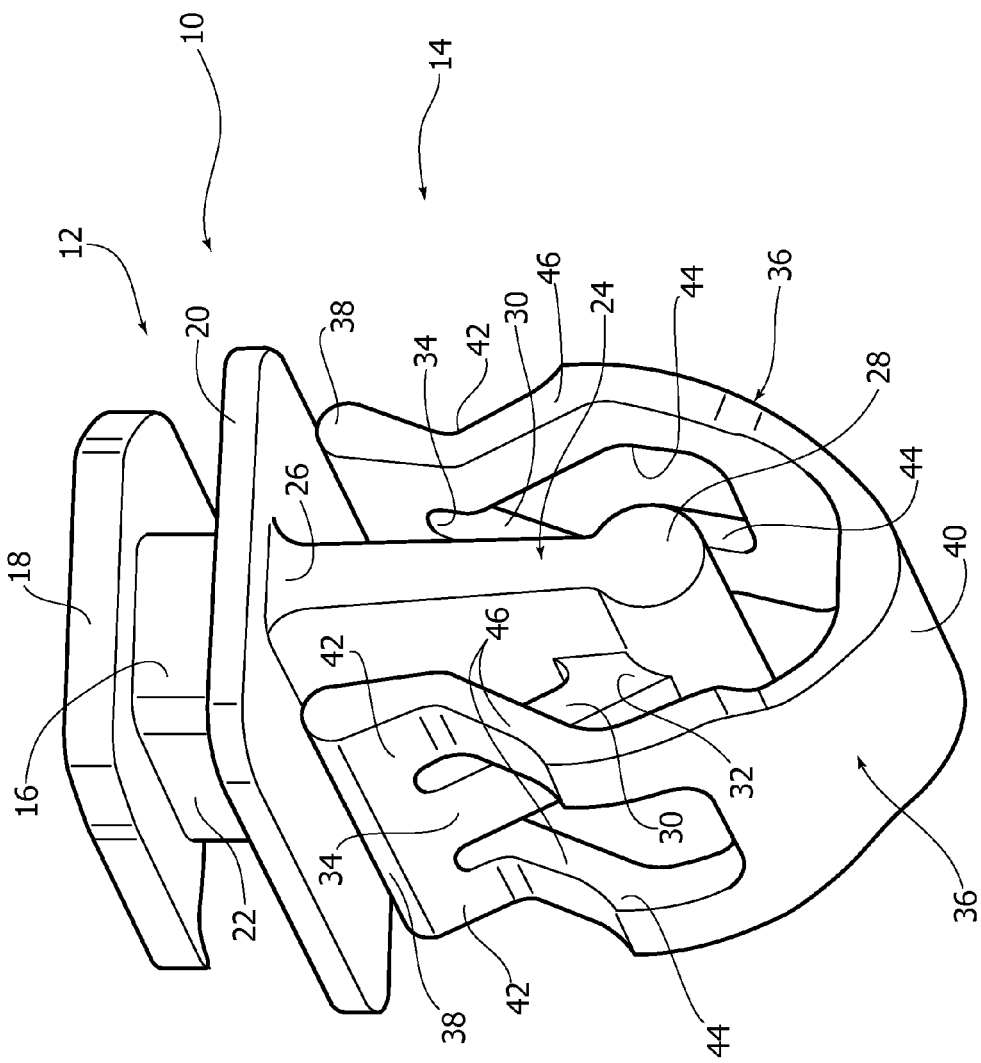
FIG. 1 is a perspective view of a fastener according to the present invention.

With reference to the drawings, 10 denotes a fastener intended to be used for fastening a panel to a support, in particular for fastening internal trim panels of vehicles to bodywork portions.

The fastener 10 comprises a head 12 and a snap-engaging portion 14, which are made of a single piece of injection-molded plastic.

The head 12 comprises a central body 16 and two walls 18, 20 situated on opposite sides of the central body 16. The walls 18, 20 project laterally beyond the central body 16 so as to define a groove 22 which surrounds the central body 16. The walls 18, 20 and the central body 16 are made of a single piece of plastic.

The snap-engaging portion 14 comprises a shank 24 projecting from the head 12 and extending in a direction at right angles to the wall 20. The shank 24 has a proximal end 26 which is integrally connected to the head 12 and a distal end 28 spaced from the head 12. In a section along a plane parallel to the wall 20 the shank 24 may have a rectangular cross-section. The distal end 28 of the shank 24 may have a rounded cylindrical shaped portion.

The snap-engaging portion 14 comprises two elastic arms 30 arranged in a V-shape. The elastic arms 30 have respective first ends 32 connected integrally to the distal end 28 of the shank 24 and second ends 34 arranged in the proximity of the head 12 and spaced in the transverse direction on opposite sides of the shank 24, so as to form with the shank 24 a structure substantially in the form of an arrow head.

The snap-engaging portion 14 comprises a substantially U-shaped retaining structure 36 consisting of a single piece of elastically deformable plastic. The retaining structure 36 has two open ends 38 connected integrally to the respective second ends 34 of the elastic arms 30. The retaining structure 36 has a rounded portion 40 which surrounds without contact the distal end 28 of the shank 24.

The retaining structure 36 has two snap-engaging seats 42 situated on opposite sides of the shank 24. Each seat 42 is open outwards and is situated between one end of the rounded portion 40 and a respective open end 38. The snap-engaging seats 42 preferably have a wide and shallow V-shaped form, with two substantially straight sections which form an obtuse angle relative to each other.

With reference to FIG. 1, the retaining structure 36 has two windows 44 formed on two opposite flanks of the retaining structure 36. The windows 44 form on each flank of the retaining structure 36 two thin portions 46 situated on opposite sides of a respective window 44. The two thin portions 46 of each flank are connected together at the respective open end 38. Each elastic arm 30 is situated inside a respective window 44 in a central portion with respect to the thin portions 46 of the retaining structure 36. The snap-engaging seats 42 are formed on the outer sides of the thin portions 46.

FIG. 3 shows the fastener 10 during use. The head 12 is engaged inside an inset seat 48 formed on a rear side 50 of a panel 52, for example an inner trim panel of vehicles. The snap-engaging portion 14 is inserted inside a hole 54 of a support 56, for example a metal plate of the bodywork of a vehicle. The rounded portion 40 is elastically deformed during insertion into the hole 54. When the snap-engaging seats 42 are located opposite the walls of the hole 54 the retaining structure 40 snaps back outwards. The two elastic arms 30 are designed to maintain the correct engaging force of the retaining structure 36 inside the hole 54. The design of the rounded portion 40 and the snap-engaging seats 42 is such that it provides a clear indication when the fastener 10 is engaged inside the hole and ensures good gripping with holes 54 of varying width and with supports 56 of varying thickness. The retaining structure 36 allows repeated insertion and removal into/from the hole 54 without the use of tools and without the risk of breakages, allowing repeated assembly and disassembly of the panel 52.

With reference to FIGS. 4 and 5, the elastic arms 30 allow a pivoting movement of the head 10 when the retaining structure 36 is engaged with the support 56. The possibility of pivoting is particularly advantageous for compensating for any assembly tolerances.

The fastener 10 is obtained by means of a single operation involving injection-molding of plastic and does not require operations for assembly of the various components.

Obviously, without altering the principle of the invention, the constructional details and embodiments may be greatly varied with respect to that described and illustrated, without thereby departing from the scope of the invention as defined by the accompanying claims.

What is claimed:

1. A fastener, in particular for fastening trim panels of vehicles to a support, comprising a head and a snap-engaging portion which are made of a single piece of injection-molded plastic, wherein the snap-engaging portion comprises:
    a shank projecting from the head and having a proximal end connected integrally to the head and a distal end spaced from the head, and
    two elastic arms arranged in the form of a V, with respective first ends connected integrally to the distal end of the shank and respective second ends arranged in the proximity of the head and spaced in the transverse direction on opposite sides of the shank, so as to form with the shank a structure substantially in the form of an arrow head,
    characterized in that the snap-engaging portion comprises a substantially U-shaped retaining structure made of a single piece of elastically deformable material and having two open ends connected integrally to the respective second ends of the elastic arms and a rounded portion which surrounds without contact the distal end of the shank, wherein the retaining structure has two snap-engaging seats which are open outwards, each being situated between the rounded portion and a respective open end.

2. The fastener as claimed in claim 1, characterized in that the retaining structure has two flanks which are situated on opposite sides of the shank and each of which has a respective window so that each of said flanks has two thin portions situated on opposite sides of the respective window and connected together at a respective open end of the retaining structure.

3. The fastener as claimed in claim 2, characterized in that each of said elastic arms is situated inside a respective window, in a central position with respect to said thin portions of the retaining structure.

4. The fastener as claimed in claim 2, characterized in that said snap-engaging seats are formed in said thin portions of the retaining structure.

5. The fastener as claimed in claim 1, characterized in that each of said snap-engaging seats has the form of a shallow V.

6. A fastener for fastening trim panels of vehicles to a support, comprising a head and a snap-engaging portion formed of a single piece of injection-molded plastic, wherein the snap-engaging portion comprises:
    a shank projecting from the head and having a proximal end connected integrally to the head and a distal end spaced from the head, and
    two elastic arms arranged in the form of a V, each elastic arm having a first end connected integrally to the distal end of the shank and a second end arranged in proximity to the head, the second ends spaced in a transverse direction on opposite sides of the shank, so as to form with the shank a structure substantially in the form of an arrow head,
    characterized in that the snap-engaging portion comprises a substantially U-shaped retaining structure made of a single piece of elastically deformable material and having two open ends and a rounded portion, each open end connected integrally to a respective one of the second ends, the rounded portion extending around the distal end of the shank without contacting the distal end of the shank, wherein the retaining structure has two snap-engaging seats which are open outwards, each snap-engaging seat situated between the rounded portion and a respective one of the open ends.

* * * * *